United States Patent [19]

Lewiner et al.

[11] 4,250,415
[45] Feb. 10, 1981

[54] ELECTROMECHANICAL TRANSDUCERS USING AN ELECTRET

[76] Inventors: Jacques Lewiner, 5, rue Bory d'Arnex, 92210 Saint-Cloud; Claude Hennion, 50, rue de la Clef, 75005 Paris, both of France

[21] Appl. No.: 920,158

[22] Filed: Jun. 29, 1978

[30] Foreign Application Priority Data

Jul. 4, 1977 [FR] France ............... 77 20524

[51] Int. Cl.$^3$ ............... H01G 7/02; H04R 19/00
[52] U.S. Cl. ............... 307/400; 179/111 E
[58] Field of Search ............... 307/400; 179/111 E; 29/592 E; 361/233; 200/181

[56] References Cited

U.S. PATENT DOCUMENTS

| 3,736,436 | 5/1973 | Crites ............... 307/400 |
| 3,967,027 | 6/1976 | Igarashi et al. ............... 179/111 E |

Primary Examiner—James W. Moffitt
Attorney, Agent, or Firm—Larson, Taylor and Hinds

[57] ABSTRACT

The invention relates to electromechanical transducers comprising an electret 4 between two electricity conducting electrodes 1 and 2. A solid intermediate layer 7 having a different deformability from that of the electret is placed between said electret and an electrode, the material forming said layer having an electrical resistivity higher than $10^{15}$ ohms.cm (for instance a silicone elastomer) and said layer having a smooth and continuous face in intimate contact with the whole of the useful area of the charged face of the electret.

16 Claims, 6 Drawing Figures

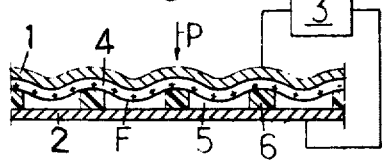
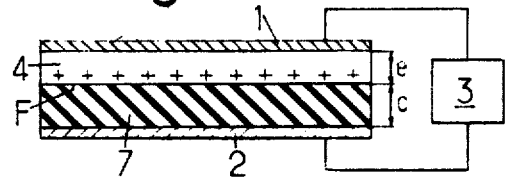
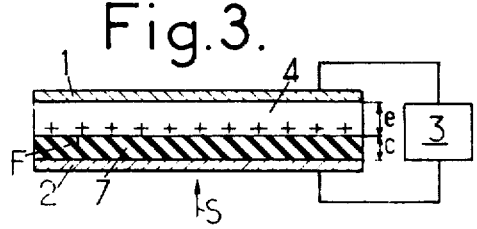
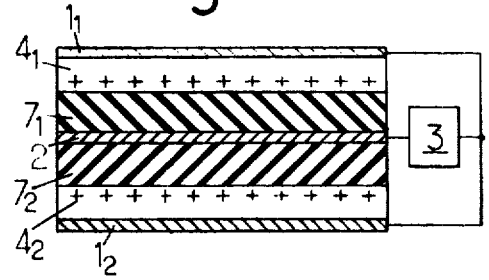
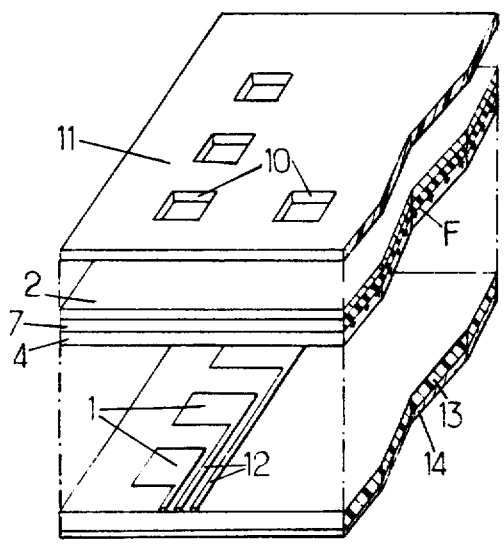
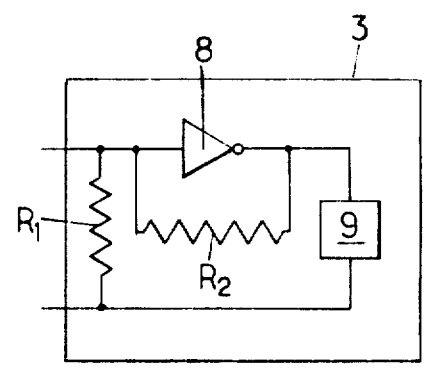

ELECTROMECHANICAL TRANSDUCERS USING AN ELECTRET

The invention relates to electromechanical transducers, i.e. devices for transforming variations of a mechanical magnitude into variations of an electrical magnitude or conversely, the first being particularly pressure variations, possibly produced by sound or supersonic waves or translated into such waves.

It concerns more particularly, among these transducers, those comprising between two electricity conducting electrodes, generally in the form of foils, connected to an outside user circuit, an electret, i.e. a dielectric foil permanently electrically charged on one at least of its two faces or in its mass, near said face.

To make possible the deformations or displacements of the charged face of the electret in relation to the opposite electrode-displacements which are transformed into electrical signals or conversely-known transducers of the kind in question generally comprise an air space between this face and this electrode.

This air space may be reduced to the spaces of very small volume created between the electret and the electrode considered (or between the electret and a solid intermediate layer interposed between the electret and the electrode) because of the natural irregularities of the facing faces: this is for example the case in U.S. Pat. Nos. 3,736,436 and 3,742,152.

The air space in question may also be larger, spacers being then interposed between the facing faces of the electret and the electrode.

In all cases, it is advisable, during the relative deformations or displacements mentioned of the electret in relation to the considered electrode, to avoid the charged face of the first from coming into contact with the second. Such contact can in fact produce saturation effects causing non linearity of operation of the transducer.

It is also advisable to prevent the mean position of the charged face of the electret in relation to the two electrodes from depending on the difference of pressure between the air contained in the above space and the environment, i.e. in short on the pressure of the environment when the gap considered is sealingly insulated from the environment, as is necessarily the case for underwater applications: on this mean position depends in fact the sensitivity of the transducer.

We may add that the deformations of relatively large magnitude of the electret fatigue this latter—whose thickness is generally very small and of the order of a few microns or of a few tens of microns only—and thus cause rapid wear thereof.

To remedy these different disadvantages, it has already been proposed to form the spacers, placed between the charged face of the electret and the facing electrode, as networks of bars (perforated grids or foils) or studs, the networks being sufficiently dense to reduce the maximum amplitude of the elementary local deformations of the electret between two adjacent elementary supports (bars or studs) to a value less than the height of these supports (see the article by SESSLER and WEST published on pages 129 to 131 of volume 12 (2), 1964 of the "Journal of the Audio Engineering Society," New York; U.S. Pat. No. 3,612,778; French Pat. No. 2 271 733).

But these spacers ensuring a distributed support of the electret are difficult to form and their mounting is delicate. Moreover, they only partially do away with the disadvantages pointed out of sensitivity to the outside pressure and of fatigue due to deformation.

The invention has especially as its aim to provide electro-mechanical transducers of the above kind in which the above disadvantages are overcome.

In U.S. Pat. No. 3,736,436 mentioned above it was indeed proposed to place between the charged face of the electret and the facing electrode an elastic solid intermediate layer, but nothing was indicated in this document as to the nature of the elastic material nor the mode of applying said layer against said electret: now elastic materials have in general a relatively low electrical resistivity, i.e. less than $10^{14}$ ohms.cm (and even less than $10^{11}$ ohms.cm for certain neoprenes), so that the exclusive use of a layer formed of such a material would lead to the construction of transducers having a quite insufficient useful life; all the information given in the patent in question implies moreover necessarily the existence of small air gaps between the electret and the intermediate layer.

The invention improves transducers of the kind in question in which a solid intermediate layer of a material having a different deformability from that of the electret is placed between the charged face of this latter and the facing face of the electrode and it is characterised in that on the one hand, the material forming this intermediate layer has a high electrical resistivity and in that, on the other hand, this layer has a smooth and continuous face in intimate contact with the whole of the useful area of the charged face of the electret.

By "high electrical resistivity" is meant preferably a resistivity greater than $10^{15}$ ohms.cm, this being able to reach and even to exceed $10^{17}$ ohms.cm for certain silicones.

In preferred embodiments recourse is had furthermore to one and/or the other of the following arrangements:

the intermediate layer is formed from an elastomer, particularly with a silicone basis, this latter being preferably a siloxane such as methylvinylsilicone or methylvinylphenylsilicone, the elastomer is in the form of a foam with integral skin, the intermediate layer has an aluminum oxide basis, when the intermediate layer and the electret are both delimited by parallel flat faces, said intermediate layer is mounted so as to be exposed to the pressure variations generated by the simple touch of a finger, this arrangement being advantageously used to construct a multiple key keyboard the intermediate layer is formed from a material having a coefficient of thermal expansion distinctly different from that of the electret the electret and the intermediate layer are formed from materials having absorption coefficients distinctly different for certain radiations, causing differences of heating and so of deformation of these materials, the assembly of the electrodes, the electret and the intermediate layer being arranged so that the layer and the electret may be reached by such radiations emitted from outside the electrodes.

the transducer is associated with a circuit adapted for the treatment of low amplitude electrical signals, such as a MOS type circuit, comprising advantageously an input resistor, an inverter and a feed-back resistor.

The invention comprises, apart from the principal arrangement, certain other arrangements which are preferably used at the same time and which will be more explicitly discussed hereafter.

In what follows, some preferred embodiments of the invention will be described with reference to the accompanying drawings in a way which is of course in no wise limiting.

FIG. 1 of these drawings shows schematically a known electro-mechanical transducer.

FIGS. 2 and 3 show schematically an electromechanical transducer constructed according to the invention, respectively for a normal condition and for a contracted condition of its intermediate layer.

FIG. 4 shows schematically another composite transducer constructed according to the invention.

FIG. 5 shows with exploded parts, a control keyboard using a plurality of transducers according to the invention.

And FIG. 6 is the diagram of a user circuit associated, according to the invention, with one of the above transducers.

Generally, the transducers to which the invention relates comprise, placed between two electricity conducting elements 1 and 2 forming electrodes and connected to an outside user circuit 3, an electret 4, i.e. a dielectric foil carrying permanently along at least one F of its two faces or adjacent thereto, electrical charges: these charges have been assumed positive in the embodiments illustrated and so have been shown in the drawings with the + sign, but they could also be negative or even be formed by dipoles directed parallel to each other.

In known transducers of the type considered, the displacements or deformations of the charged face F of the electret with respect to the opposite electrode 2 cause voltage variations at the terminals of the electrodes and conversely, which allows in particular supersonic waves or sound waves to be transformed into electrical signals or conversely, or even to transform mechanical shocks or pressures into electrical control signals.

Such relative displacements or deformations of face F with respect to the facing face of electrode 2 are generally made possible by the presence therebetween of a free gap 5 relatively narrow and filled with air, this gap being created by placing spacers between said two faces.

With the purpose of preventing, for the reasons outlined above, the considered displacements or deformations of face F from having a large amplitude, it has already been proposed to use as spacers relatively dense networks of bars (grids) or rigid studs which distribute the support zones of face F all along this latter: such multiple spacers, which have been shown diagrammatically by studs 6 in FIG. 1, are relatively costly to manufacture and difficult to position; moreover, if they reduce the disadvantages mentioned above, they do not overcome them.

In particular, the thickness of the assembly formed by the electret 4 and electrode 1 applied thereagainst, the electrode being formed particularly by metallization, is often very small, being generally less than 100 microns, so that, even if the openings of the meshes of the supporting networks considered are only of the order of a mm, relatively accentuated local deformations of said assembly can still be observed, as can be seen from FIG. 1, when a pressure P is applied thereto.

It will moreover be noted that the portion of face F in contact with spacer elements 6 is immobilised and so does not participate in the operation of the transducer.

To remedy such disadvantages, in accordance with the invention, there is placed between face F and the facing electrode 2 a layer 7 (FIG. 2) presenting:

a deformability different from that of electret 4 under the influence of certain outside parameters applicable to said layer, parameters whose variations it is desired to use with the help of the transducer considered, a high electrical resistivity, preferably greater than $10^{15}$ ohms.cm, being able to reach advantageously and even to exceed $10^{17}$ ohms.cm, and a smooth and continuous face in intimate contact with the whole of the useful area of face F.

By "intimate contact" is meant a surface to surface adhesion without any intermediate layer or trace of air, which is advantageously obtained:

by giving to the smooth face of the intermediate layer an excellent surface condition (without unevennesses greater than 10 microns), this layer being for example manufactured to this end by moulding, and by juxtaposing this layer and the electret in a vacuum.

In a first particularly advantageous embodiment shown in FIGS. 2 and 3, said layer 7 is elastic and formed from an elastomer more flexible or softer than the electret.

As can be seen in FIG. 2, this layer fills completely the space between face F and electrode 2, which was occupied in known constructions by air and the grid.

But, because of its deformability, said layer in no way opposes the relative displacements of face F in relation to electrode 2.

Thus it is that, if a tightening pressure S (FIG. 3) is applied between the two electrodes, thickness c of this layer 7 is reduced whereas thickness e of the electret remains constant, which brings interface F nearer of electrode 2 parallel to itself. The assembly then elastically assumes its initial condition (FIG. 2) as soon as pressure S is removed.

It can be shown that, in such conditions, the sensitivity of the transducer, i.e. the ratio between the electrical voltage V created between electrode 1 and 2 and pressure S is inversely proportional to Young's modulus E for intermediate layer 7.

It can also be shown that, if we call p the permittivity of the electret and p' that of the layer 7, the sensitivity of the transducer is maximum when the products pc and p'e are equal and that, if the electret is practically indeformable, said sensitivity is practically independent of the static outside pressure when the first of these products, pc, is very great with respect to the second p'e.

Again, it can be shown that, if pressure S varies sinusoidally at frequency f the response of the transducer becomes constant when this frequency f exceeds a certain threshold and that, to reduce this threshold, it is advantageous to use an impedance adaptation circuit having high input resistance (particularly of the order of 1 gighom), a low input capacity and a low output impedance, which may be easily achieved by means of field effect transistors.

The electret is preferably formed from a fluorinated polymer. It may have a substituted polyolefin basis such as: polyethylene, polypropylene, polytetrafluoroethylene, a polycarbonate, or a halogenated polyhydrocarbon such as fluorinated propylene polyethylene, a copolymer of hexafluoropropylene and tetrafluoroethylene, a polyvinylidene fluoride, a compound containing at least 95% polychlorotrifluoroethylene, a polychlorotrifluoroethylene and polytetrafluoroethylene based compound, a polyvinylidene fluoride and polytetrafluoroethylene based compound.

It can also be formed as a thin layer from an inorganic compound such as aluminum oxide (electrical resistivity: $10^{16}$ ohms.cm).

Its thickness may be between a few hundred angström and a few centimeters.

Its superficial charge density may be between $10^{-11}$ C/cm$^2$ and $10^{-4}$ C/cm$^2$.

The elastomer forming layer 7 may be a silicone based compound of a thickness between a few thousand angström and a few centimeters.

This compound is preferably a silanol polyether, more often called siloxane, such as for example methylvinylsilicone—or methylvinylsiloxane—(named VMQ according to standard ASTM.D 1418) or methylvinylphenylsilicone—or methylvinylphenylsiloxane (named PVMQ).

It may be in compact and solid form or on the contrary in the form of a foam: in this latter case, layer 7 in question is formed with an integral skin, i.e. with a continuous smooth surface so as to ensure the above-mentioned intimate contact with all points of the area of the facing face F of the electret.

According to one variation, intermediate layer 7 may be formed by a part of the electret itself whose deformability has been modified by an appropriate treatment of any desirable nature, mechanical, chemical, electrical or using radiation (visible light, electron beam, X or gamma rays . . . ).

Electrodes 1 and 2 may be formed in any desirable way, i.g. by vacuum or electrochemical metallisation of the face opposite the electret or of layer 7. These electrodes could also be formed by simple foils or metal ribbons laid on the face considered of the electret or of layer 7.

It is to be noted that the assembly may be given a tubular shape, one of the two electrodes being a wire or rod which extends along the axis of the tube and being surrounded by concentric coaxial tubes forming successively the intermediate layer, the electret and the second electrode.

Purely by way of example and of course in no wise limiting the invention, it can be pointed out that, for a transducer of the kind shown in FIGS. 2 and 3 and comprising:

an electret 4 formed by a fluorinated polypropylene polyethylene foil of 1 mm thickness whose face F has a surface charge of $10^{-9}$ C/cm$^2$, an intermediate layer 7 formed by a silicon elastomer foil 1 mm thick, and electrodes 1 and 2 deposited by vacuum metallization on the external faces of the two foils applied one against the other, the sensitivity of this transducer in an open circuit is of the order of 1 mV/pascal.

The above proposed structure has, in relation to those already known, numerous advantages and in particular the following:

during operation of the transducer, the electret suffers no deformation since it is the intermediate layer 7 which is deformed: this phenomenon is favourable to the long life of the electret and so of the transducer, as pointed out above, the sensitivity of the transducer can be made independent of the static pressure of the environment in which it is placed, which can be advantageous for a certain number of applications and in particular for underwater detection, the charged face F of the electret, since it is intimately coated over its whole length with layer 7, is perfectly protected from all outside agents which might damage it (dust, damp, electrical ions etc. . . ), even when the transducer is subjected to a high pressure, no point of the charged face F of its electret can come into contact with the electrode opposite, since it is separated from this latter by layer 7, since no local deformation is required of the electret, this latter may be provided in great thickness, which improves its sensitivity, the absence of any gap or spacer between the charged face of the electret and the electrode opposite allows a great flexibility in the manufacture of the laminated assembly composed of the electret, the flexible layer and the two electrodes plated intimately one against the other, this assembly being readily marketable in the form of composite foils, ribbons or tubes of large size or even deformed into a shape other than flat or cylindrical by stamping or in any other desirable way, the shape adopted being able particularly to be a bulging surface, centered for example on a sound source with a view to interference free recording, the presence of an elastomer layer in the transducer damps considerably the resonance frequency of this latter, which enlarges its pass-band, in particular towards the high frequencies and avoids the use of external damping means, the materials forming the electret and the intermediate layer have an acoustic impedance close to that of water, so that the transducers considered are perfectly adapted to the emission or the reception of acoustic waves in aqueous or similar environments (underwater detection, medical analysis . . . ), these treatments being carried out practically without loss of energy and without reflection ("transparent" antenna): thus the acoustic impedance of water is $1.5 \times 10^6$ kg/m$^2$s and that of a transducer according to the invention is of the order of $1.8 \times 10^6$ kg/m$^2$s whereas that of air layer transducers is only $3.10^4$ kg/m$^2$s and that of piezo-electric ceramics reaches $28.10^6$ kg/m$^2$s.

With respect to the elementary assembly shown in FIGS. 2 and 3, numerous variations may be envisaged.

Thus, in the variation shown in FIG. 4, two assemblies of the kind shown in FIG. 2 are stacked head to foot alongside one another, electrode 2 being then disposed in the centre of the stack and being common to both stacked assemblies: in other words we find stacked successively on each face of this electrode 2, an elastic layer ($7_1$, $7_2$), an electret ($4_1$, $4_2$) and a second electrode ($1_1$, $1_2$), the order of stacking of the elastomer layer and the electret being reversible.

By interconnecting the two second electrodes, we obtain an electrical shield for the transducer.

With such a connection, the transducer obtained is practically insensitive to its flexions about an axis passing through the mean plane of the central electrode, any local mechanical or electrical modification affecting one side of this electrode due to such a flexion being automatically compensated for by an inverse local modification of the other side of this electrode.

Of course, the type of stacking described with reference to FIG. 4 can be generalised.

There can also be used a plurality of elementary transducers of the kind described above, forming for example a sort of mosaic and interconnected in series and/or parallel in a way known per se.

In FIG. 5, there is shown a particularly advantageous application of the above-described structures having elastic intermediate layers.

It refers to a multiple control keyboard whose keys are actuated simply by brushing with the fingers.

A keyboard of this type has already been proposed in U.S. Pat. No. 3,668,417, but in this patent, the displacements of the charged face of the electret are made possible by the presence of an air layer along this face and not by the elasticity of an intermediate layer.

In the present case, the keyboard has a plurality of elastomer transducers of the kind described with references to FIGS. 2 and 3 disposed respectively opposite as many apertures 10 in an outer rigid cover 11. Here, electrode 2, elastic layer 7 and electret 4 are all three formed from continuous foils common to all the transducers, and it is electrode 1 which alone is divided into independent conducting areas each connected by a conductor 12 to an outside user circuit (not shown).

In the case of this FIG. 5 it has been assumed that these areas 12 are formed by metallization of an extra insulating foil 13 itself brought against the face of electret 4 opposite the charged face F thereof.

Moreover, this foil 13 is itself covered on the outside by a conducting layer 14, which may be electrically connected to electrode 2 so as to form a screening for the assembly.

By brushing with the finger one of the conducting areas of electrode 2, which appears through one of the apertures 10, the piece of elastic foil 7 is compressed, which brings said area 2 of the portion opposite face F closer to electret 4: this bringing nearer generates a potential difference between this area 2 and the other conducting area 1 opposite, which potential difference may be used for any purposes desired.

In such cases, as well as more generally in all cases where it is desired to use the sensor for detecting the overshooting of a pressure threshold (push-button, passage detecting door-mat, vehicle counting . . . ) it is advantageous to associate this sensor with a semi-conductor circuit adapted for the treatment of low amplitude electrical signals such as generated by such a sensor: such a circuit is for example an MOS circuit, preferably of the CMOS type, having the advantages of high input impedance, low consumption, good compatibility with the digital electronic systems and low cost.

Such a circuit has been shown for example in FIG. 6; it comprises essentially a resistor R1 determining the input impedance of the circuit, an inverter 8, constructed particularly by means of a NAND gate, and a feed-back resistor R2. From an analog signal generated by the transducer this circuit allows a logic signal to be obtained compatible with the user circuit properly speaking to which it is fed: said circuit has been designated by the reference 9 in the drawing. The choice of the two resistors R1 and R2 determines the switching threshold of inverter 8 and so the sensitivity of the device.

Instead of control by brushing with a finger or by direct touch, the control pressure may be exerted on the different transducers by means of push-buttons and/or dead point overshoot resilient mechanisms.

As an example, push-buttons could be used, each associated with an elastic rocking mechanism gauged so as to project a piece or a part of a deformable piece on to the area of electrode 2 corresponding to this button as soon as this latter has been pressed beyond a certain threshold. Such a formula allows trigger pressure thresholds to be determined accurately at will.

Generally, the structures described above lend themselves particularly well to applications bringing into play a pressure variation, because of the elasticity of the intermediate layer, which allows a rapid and reliable automatic return of each transducer to its rest position as soon as the pressure exerted thereon is removed.

Thus, with the structures in question, very compact and sensitive pressure sensors can be constructed usable in particular for recording sounds (sound sensors) or else for medical applications (occular displacements, blood pressure, intercranial pressure, respiratory flow sensors . . . ).

Said structures can also be used for measuring pressures in difficult conditions (shock waves . . . ) considering the excellent mechanical and electrical protection of the electret which remains permanently in intimate contact with the elastomer.

These structures can also be used at relatively high temperatures if, for the electret and for the elastomer, materials are chosen having a good resistance to the temperature, the elastomer being for example a silanol polyether and the electret a halogenated polyhydrocarbon based polymer.

One particular use of such transducers under high pressure is the production of sparks in a gas for the purpose, for example, of lighting a combustible mixture: if in fact a high pressure is exerted on a transducer of the above kind whose electrodes are connected to those of a capacitor, this latter can be charged up to the breakdown voltage of a gas present between these latter electrodes, said breakdown being favoured by these latter having a pointed shape.

The presence of an elastic layer in the transducers considered may also be used for damping effects, e.g. for applications using safety or end stops.

Instead of being more deformable than the electret, the intermediate layer could be selected less deformable than this electret, which could be envisaged in the case of a particularly hard intermediate layer.

This would for example be the case for a fluorinated propylene polyethylene (sometimes known under its commercial name TEFLON FEP) electret laid on a fused glass support, made from fused quartz or silica which forms then the intermediate layer.

In other variations, the difference between the relative deformabilities of the electret and the intermediate layer is not manifested directly by application of a mechanical stress (pressure or shock), but indirectly by temperature variations or even more indirectly by irradiation.

Thus, if intermediate layer 7 (FIG. 2) has a thermal expansion coefficient very different from that of electret 4, the heating of the assembly causes as before a relative displacement of charged face F of the electret in relation to one of the electrodes, such a displacement being capable of creating an electrical voltage at the terminals of these electrodes. Thus, with the transducers considered, temperature detectors can be constructed capable of automatically triggering off a visual or sound alarm as soon as said temperature exceeds a predetermined threshold.

By way of example, we can take up again the example which has just been given since the respective thermal expansion coefficients of fluorinated propylene polyethylene and fused quartz are $9.10^{-5}$ cm/cm/degree and $5,5.10^{-7}$ cm/cm/degree.

An electret made from polyethylene (expansion coefficient $17.10^{-5}$ cm/cm/degree) or from polyvinylidene chloride ($19.10^{-5}$) plated on a cristalline alumina support, a substance whose expansion coefficient is close to that of quartz, could also be used, this support forming the intermediate layer.

Or again recourse could be had to an electret of the above kind made from fluorinated propylene polyethylene plated on a polyimide support (expansion coefficient $2.10^{-5}$ cm/cm/degree): laminates of these two polymers are distributed under the name KAPTON type F and it is sufficient to charge the desired portion thereof in order to make them capable of forming transducers according to the invention.

It is also possible for intermediate layer 7, with regard to certain radiations, to have a power of absorption very different from that of the electret and to be capable of transforming these radiations into heat, if those latter are not already heat radiations (infrared).

In such a case, if the transducer is arranged so that the intermediate layer and the electret are both exposed to the radiations considered, one of these two elements is heated more than the other and so is more expanded than the other, even if their thermal expansion coefficients are equal, which results again in a relative displacement of interface F in relation to the electrodes.

The same result could also be obtained, even with identical coefficients of absorption for the two elements with regard to the radiation considered, if the assembly is arranged so that only one of these elements can be exposed to such radiations or if one of them is much more exposed to said radiations than the other.

As examples the following can be mentioned:
an electret of the above type made from fluorinated propylene polyethylene practically transparent in the visible spectrum, plated on a ruby support-forming the above intermediate layer—(chromium doped alumina with a weight concentration of impurities of $10^{-2}$ to $10^{-4}$), a substance which absorbs to a very high degree the blue and transforms it partly into heat, partly into red light;
an electret of the same type as previously whose response is practically flat up to the wave length of 3.8 microns, plated on a TETRASIL glass obtained from silicon halogenide, which also has a very flat response, except for radiations whose wave-length is close to 2.75 microns, which it transforms into heat,
conversely, an electret, still of the previous type, very absorbent in the wave-length range between 7.5 and 9.5 microns, plated on a support such as usually used in infrared spectographs for their transparency to these rays, particularly made from potassium bromide KBr, sodium chloride NaCl, silver chloride AgCl or caesium iodide CsI.

The transducers constructed according to these three examples allow detection or measuring to be carried out on radiations respectively blue, having a wave-length equal to 2.75 microns and infrared (infrared imagery).

In these different cases, it is of course advisable that at least one of the electrodes is transparent to the radiations used; it is advantageously formed by metallization of a very thin layer, e.g. of gold with a thickness of a few angströeller, which is possible for the contact resistance of such a layer can be kept relatively low (10 ohms) much less than the input impedance of the user circuit.

Following which and whatever the embodiment adopted, there is finally provided a transducer whose constitution, operation and advantages follow sufficiently from what has gone before.

As is evident and as it follows moreover already from what has gone before, the invention is in no wise limited to those of its embodiments and modes of application which have been more especially considered; it embraces, on the contrary, all variations thereof, particularly those where the transducers considered are used for mechanical signal emission purposes (acoustic or other) rather than for reception or detection purposes of such signals as most of those which have been more particularly described above.

We claim:

1. An electro-mechanical transducer comprising disposed between two electrically conducting electrodes which have connected to the same outside utilization circuit, on the one hand, an electret comprising a dielectric foil permanently electrically charged on at least one of its two faces or adjacent thereto, and on the other hand, disposed between at least one face of the electret and the facing electrode face, a solid intermediate layer made from a material having a deformability different from that of the electret, the material forming said intermediate layer having an electrical resistivity at least greater than $10^{15}$ ohms/cm and said intermediate layer having a smooth and continuous face in intimate contact with the whole of the useful area of said at least one charged face of the electret.

2. A transducer according to claim 1, characterized in that the intermediate layer is formed from an elastomer.

3. A transducer according to claim 2, characterized in that the elastomer comprises a silicone-based composition.

4. A transducer according to claim 2, characterized in that the elastomer is in the form of a foam with an integral skin.

5. A transducer according to claim 3 wherein said elastomer comprises methylvinylsiloxane.

6. A transducer according to claim 3 wherein said elastomer comprises methyvinylphenylsiloxane.

7. A transducer according to claim 1, characterized in that the intermediate layer comprises an aluminum oxide-based composition.

8. A transducer according to claim 1, characterized in that the electrodes, the electret and the intermediate layer are coaxial and concentric.

9. A transducer according to claim 1, for which the intermediate layer and the electret are both include parallel flat faces, said transducer being arranged so as to expose its intermediate layer to pressure variations generated by the simple touch of a finger.

10. A transducer according to claim 9, wherein said transducer is associated with several other transducers of the same type, each actuatable through an aperture in a rigid cover, all the apertures in said cover being aligned with each other so as to form a multiple control keyboard.

11. A transducer according to claim 1, characterized in that the intermediate layer is formed from a material having a thermal expansion coefficient distinctly different from that of the electret.

12. A transducer according to claim 1, characterized in that the electret and the intermediate layer are formed from materials having absorption coefficients distinctly different for certain radiations, thereby resulting in differences in heating and thus in the deformation of these materials, the assembly of the electrodes, the electret and the intermediate layer being arranged so that the layer and the electret may be reached by such radiations emitted from outside the electrodes.

13. A transducer according to claim 1, further comprising, stacked successively on each of the two faces of a common central electrode, an electret, an intermediate layer made from of material which deforms differently than the last-mentioned electret and which has an electrical resistivity greater than $10^{15}$ ohms/cm. and a second electrode, the order of stacking of the layer and the electret being reversible.

14. A transducer according to claim 1 wherein the transducer is associated with an electrical circuit of the MOS type.

15. A transducer according to claim 14, characterized in that the MOS type electrical circuit comprises a resistor determining the input impedance, an inverter and a feed-back resistor, the output of this circuit being applied to a utilization circuit.

16. A transducer according to claim 1, wherein the transducer is associated with a dead point overshoot resilient control mechanism allowing the trigger pressure threshold to be accurately determined.

* * * * *